(12) United States Patent
Kushihara et al.

(10) Patent No.: US 10,829,589 B2
(45) Date of Patent: Nov. 10, 2020

(54) HEAT-CURABLE RESIN COMPOSITION

(71) Applicant: Shin-Etsu Chemical Co., Ltd., Tokyo (JP)

(72) Inventors: Naoyuki Kushihara, Annaka (JP); Kazuaki Sumita, Annaka (JP)

(73) Assignee: Shin-Estu Chemical Co., Ltd., Tokyo (JP)

(*) Notice: Subject to any disclaimer, the term of this patent is extended or adjusted under 35 U.S.C. 154(b) by 3 days.

(21) Appl. No.: 16/378,618

(22) Filed: Apr. 9, 2019

(65) Prior Publication Data

US 2019/0330414 A1    Oct. 31, 2019

(30) Foreign Application Priority Data

Apr. 26, 2018    (JP) .................................. 2018-084878

(51) Int. Cl.

| | |
|---|---|
| *C08G 73/00* | (2006.01) |
| *C08K 3/013* | (2018.01) |
| *C08L 1/12* | (2006.01) |
| *C08K 3/22* | (2006.01) |
| *C08G 61/02* | (2006.01) |
| *C08L 61/12* | (2006.01) |

(52) U.S. Cl.
CPC ............ *C08G 61/025* (2013.01); *C08G 73/00* (2013.01); *C08K 3/013* (2018.01); *C08L 61/12* (2013.01); *C08G 2261/143* (2013.01); *C08K 2003/222* (2013.01); *C08K 2003/2237* (2013.01)

(58) Field of Classification Search
None
See application file for complete search history.

(56) References Cited

U.S. PATENT DOCUMENTS

| | | | | |
|---|---|---|---|---|
| 6,162,876 | A * | 12/2000 | Yeager | ............... C08G 73/0655 |
| | | | | 525/390 |
| 2013/0023640 | A1* | 1/2013 | Ikeno | .................. C08G 73/0644 |
| | | | | 528/67 |
| 2016/0186024 | A1* | 6/2016 | Sumita | ...................... C08G 8/22 |
| | | | | 257/789 |
| 2017/0009007 | A1 | 1/2017 | Sumita et al. | |
| 2017/0226263 | A1* | 8/2017 | Kobayashi | .............. C08L 61/34 |
| 2018/0186925 | A1 | 7/2018 | Sumita et al. | |

FOREIGN PATENT DOCUMENTS

| | | | |
|---|---|---|---|
| JP | 2003-2949 | 1/2003 | |
| JP | 2003-332701 | 11/2003 | |
| JP | 2010-254838 | 11/2010 | |
| JP | 2014-5338 | 1/2014 | |
| JP | 2017-14472 | 1/2017 | |
| WO | WO-2016098533 A1 * | 6/2016 | ............ C09J 161/00 |

\* cited by examiner

*Primary Examiner* — Christopher M Rodd

(74) *Attorney, Agent, or Firm* — Oblon, McClelland, Maier & Neustadt, L.L.P.

(57) ABSTRACT

Provided is a heat-curable resin composition having an excellent workability, and capable of yielding a cured product having both a heat resistance and a low water-absorption property. The heat-curable resin composition contains:
(A) a cyanate ester compound having in one molecule at least two cyanato groups, and having a cyanate ester group equivalent of 50 to 140;
(B) a cyanate ester compound having in one molecule at least two cyanato groups, and having a cyanate ester group equivalent of 150 to 500; and
(C) a curing accelerator, in which the cyanate ester compound (A) is in an amount of 20 to 85% by mass per a total of 100% by mass of the components (A) and (B), and the cyanate ester compound (B) is in an amount of 15 to 80% by mass per the total of 100% by mass of the components (A) and (B).

19 Claims, 1 Drawing Sheet

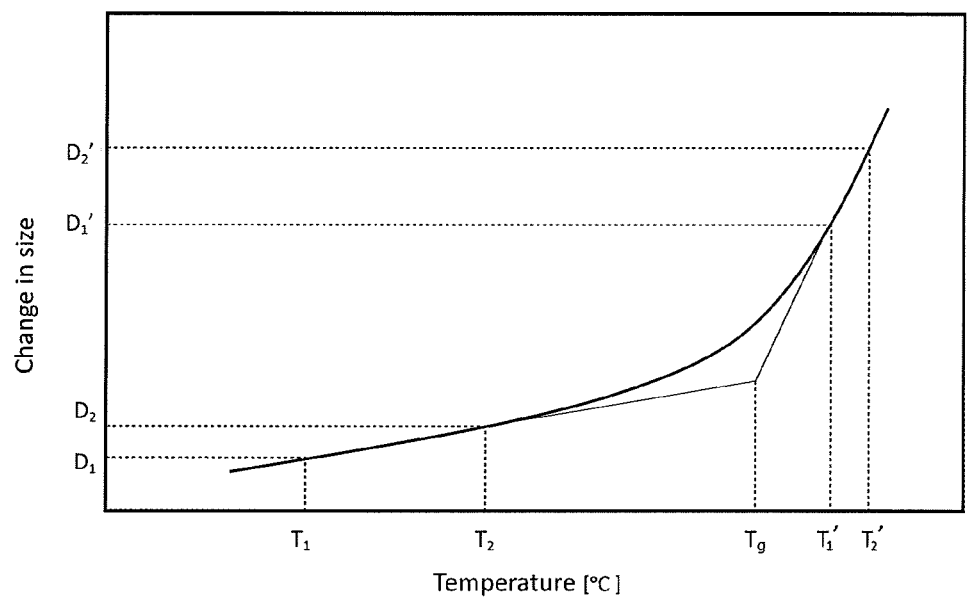

HEAT-CURABLE RESIN COMPOSITION

BACKGROUND OF THE INVENTION

Field of the Invention

The present invention relates to a heat-curable resin composition. Particularly, the invention relates to a heat-curable resin composition having a high heat resistance and a low water-absorption property.

Background Art

In recent years, due to global-scale environmental countermeasures such as measures against global warming and measures against energy issues, hybrid vehicles and electric vehicles have prevailed in the automotive field, and more inverter motors are now installed as an energy-saving measure in the field of home electric appliances. As for these hybrid vehicles, electric vehicles or inverter motors, a power semiconductor for converting AC to DC and vice versa, and transforming voltage is critical.

However, silicon (Si) that has been used for many years as a power semiconductor is reaching its performance limit, and it has been difficult to expect a dramatic improvement in its performance. There, next-generation power semiconductors employing materials such as silicon carbide (SiC), gallium nitride (GaN) and diamond have gained attention.

SiC and GaN have an excellent property that their band gaps are approximately three times wider than that of Si, and their breakdown field strengths are 10 or more times higher than that of Si. Other properties of SiC and GaN include a high-temperature operation (e.g. reports on operation at 650° C. in case of SiC), a high thermal conductivity (thermal conductivity of SiC is at the similar level as Cu), and a high saturation electron drift velocity. Due to these properties, the usage of SiC and GaN makes it possible to reduce the on-resistance of a power semiconductor, and significantly cut the power loss in a power converter circuit.

At the moment, power semiconductors are generally protected through, for example, transfer molding using an epoxy resin, and potting encapsulation using a silicone gel. Particularly, for automotive application, transfer molding using an epoxy resin has become mainstream in terms of reduction in size and weight. Epoxy resin is a balanced heat-curable resin superior in moldability, adhesion to a base material, and mechanical strength. However, in the case of an epoxy resin, thermal decomposition progresses at crosslinking points at a temperature greater than 200° C., which may make it impossible for the epoxy resin to serve as an encapsulation material in a high-temperature operation environment as that anticipated in the case of SiC and GaN.

Therefore, as heat-curable resin compositions superior to epoxy resins, there are disclosed compositions each containing a cyanate ester compound, and capable of yielding cured products having a heat resistance of greater than 200° C. (JP-A-2010-254838, JP-A-2003-332701 and JP-A-2003-002949). Since these compositions normally do not undergo a thermosetting (trimerizing) reaction at a low temperature, the cured products thereof can only be obtained by mixing a curing promoting catalyst thereinto.

In order to trigger curing at a temperature of not higher than 200° C., there is disclosed a composition employing a phenolic resin as a catalyst (JP-A-2017-014472). While a cured product of this composition is superior in low-temperature curability, it has downsides such as an insufficient water resistance and a high water absorption rate.

In order to improve a moisture resistance reliability, there is disclosed a composition in which a cyanate ester compound and an epoxy resin are combined together (JP-A-2014-005338). While a cured product of this composition has an improved moisture resistance reliability, it has a downside such as a poor thermal decomposition resistance at high temperatures.

SUMMARY OF THE INVENTION

Thus, it is an object of the present invention to provide a heat-curable resin composition capable of yielding a cured product having both a heat resistance and a low water-absorption property.

The inventors of the present invention conducted a series of studies to solve the above problems, and completed the invention as follows. That is, the inventors found that the above objectives could be achieved by a heat-curable resin composition prepared by combining a particular cyanate ester compound and a particular phenol curing agent.

Thus, the present invention is to provide the following heat-curable resin composition.

[1]
A heat-curable resin composition containing:
(A) a cyanate ester compound having in one molecule at least two cyanato groups, and having a cyanate ester group equivalent of 50 to 140;
(B) a cyanate ester compound having in one molecule at least two cyanato groups, and having a cyanate ester group equivalent of 150 to 500; and
(C) a curing accelerator,
wherein the cyanate ester compound (A) is in an amount of 20 to 85% by mass per a total of 100% by mass of the components (A) and (B), and the cyanate ester compound (B) is in an amount of 15 to 80% by mass per the total of 100% by mass of the components (A) and (B).

[2]
The heat-curable resin composition according to [1], further comprising:
(D) an inorganic filler.

[3]
The heat-curable resin composition according to [1] or [2], wherein the curing accelerator (C) contains a phenolic resin.

[4]
The heat-curable resin composition according to any one of [1] to [3], wherein the component (B) is a cyanate ester compound having in one molecule at least one allyl group.

The cured product of the heat-curable resin composition of the present invention has both a high heat resistance and a low water-absorption property. Therefore, the cured product of the present invention can be used as an encapsulation material capable of maintaining an adhesion force even in a high-temperature and high-humidity operation environment.

BRIEF DESCRIPTION OF THE DRAWINGS

FIG. 1 is a diagram showing a method for determining a glass-transition temperature.

DETAILED DESCRIPTION OF THE INVENTION

The present invention is described in detail hereunder.
(A) Cyanate Ester Compound
A component (A) is a cyanate ester compound having at least 2, preferably 2 to 12 cyanato groups; and a cyanate ester group equivalent (molecular weight per one cyanate ester group) of 50 to 140, preferably 70 to 135, more preferably 100 to 135.

As a cyanate ester compound as the component (A) having at least 2 cyanato groups, a generally known cyanate ester compound may be used. Examples of such cyanate ester compound are as follows. For example, there may be used bis(4-cyanatophenyl)methane, bis(3-methyl-4-cyanatophenyl)methane, bis(3,5-dimethyl-4-cyanatophenyl) methane, 1,1-bis(4-cyanatophenyl)ethane, 2,2-bis(4-cyanatophenyl)propane, 1,3-dicyanatobenzene, 1,4-dicyanatobenzene, 2-tert-butyl-1,4-dicyanatobenzene, 2,4-dimethyl-1,3-dicyanatobenzene, 2,5-di-tert-butyl-1,4-dicyanatobenzene, tetramethyl-1,4-di cyanatobenzene, 1,3,5-tricyanatobenzene, 2,2'-dicyanatobiphenyl, 4,4'-dicyanatobiphenyl, 3,3',5,5'-tetramethyl-4,4'-dicyanatobiphenyl, 1,3-dicyanatonaphthalene, 1,4-dicyanatonaphthalene, 1,5-dicyanatonaphthalene, 1,6-dicyanatonaphthalene, 1,8-dicyanatonaphthalene, 2,6-dicyanatonaphthalene, 2,7-dicyanatonaphthalene, 1,3,6-tricyanatonaphthalene, bis(4-cyanatophenyl)ether, 4,4'-(1,3-phenylenediisopropylidene)diphenyl cyanate, bis(4-cyanatophenyl)thioether, tris(4-cyanato-phenyl)phosphine, phenol novolac type cyanate and cresol novolac type cyanate. Any one kind of these cyanate ester compounds may be used singularly, or two or more kinds of them may be mixed and thus used in combination. Among the above examples, preferable cyanate ester compounds are bis(4-cyanatophenyl)methane, bis(3-methyl-4-cyanatophenyl) methane, 1,1-bis(4-cyanatophenyl)ethane and phenol novolac type cyanate ester that are liquid at 80° C. More preferred are 1,1-bis(4-cyanatophenyl)ethane and phenol novolac type cyanate ester.

It is preferred that the component (A) be contained in an amount of 20 to 85% by mass, more preferably 40 to 75% by mass, and even more preferably 45 to 70% by mass, per a total of 100% by mass of the components (A) and (B).

(B) Cyanate Ester Compound

A component (B) is a cyanate ester compound having at least 2, preferably 2 to 12 cyanato groups; and a cyanate ester group equivalent of 150 to 500, preferably 150 to 450, more preferably 150 to 400.

As a cyanate ester compound as the component (B) having at least 2 cyanato groups, a generally known cyanate ester compound may be used. Examples of such cyanate ester compound are as follows. For example, there may be used bis(3-ethyl-4-cyanatophenyl)methane, bis(4-cyanatophenyl)sulfone, 1,1,1-tris(4-cyanatophenyl)ethane, 2,2-bis (4-cyanatophenyl)-1,1,1,3,3,3-hexafluoropropane, diallylbisphenol A-type cyanate ester, diallylbisphenol F-type cyanate ester, biphenyl aralkyl-type cyanate ester, dicyclopentadiene novolac-type cyanate, naphthalene ring-containing cyanate ester, aralkyl type cyanate ester and heterocyclic cyanate ester. Any one kind of these cyanate ester compounds may be used singularly, or two or more kinds of them may be mixed and thus used in combination. Among the above examples, preferable cyanate ester compounds are diallylbisphenol A-type cyanate ester, diallylbisphenol F-type cyanate ester, biphenyl aralkyl-type cyanate ester and naphthalene ring-containing cyanate ester.

It is preferred that the component (B) be contained in an amount of 15 to 80% by mass, more preferably 30 to 70% by mass, and even more preferably 35 to 60% by mass, per the total of 100% by mass of the components (A) and (B).

(C) Curing Accelerator

Any known curing accelerator may be used as the curing accelerator as the component (C), as long as it is capable of promoting the curability of the cyanate ester compounds as the components (A) and (B). Examples of the curing accelerator as the component (C) include phosphorous compounds such as triphenylphosphine, tributylphosphine, tri(p-methylphenyl)phosphine, tri(nonylphenyl)phosphine, triphenylphosphine-triphenylborane and tetraphenylphosphine-tetraphenylborate; tertiary amine compounds such as triethylamine, benzyldimethylamine, α-methylbenzyldimethylamine and 1,8-diazabicyclo[5.4.0]undecene-7; salts with tertiary amine compounds such as 1,8-diazabicyclo [5.4.0]undecene-7; imidazole compounds such as 2-methylimidazole, 2-phenylimidazole and 2-phenyl-4-methylimidazole; and phenolic resins such as a resorcinol-type phenolic resin, a diallylbisphenol resin, a phenol novolac resin and an allylphenol novolac resin.

One kind of the component (C) may be used singularly, or two or more kinds thereof may be used in combination.

It is preferred that a total amount of the curing accelerator (C) added be 0.1 to 10% by mass, more preferably 0.2 to 5.5% by mass, per the total of 100 parts by mass of the components (A) and (B).

(D) Inorganic Filler

Although the heat-curable resin composition of the present invention can be obtained by combining given amounts of the components (A) to (C), an inorganic filler (D) as an optional component may also be added. The inorganic filler (D) is added to improve the resin strength of the heat-curable resin composition and lower thermal expansion. Examples of the inorganic filler include silicas (e.g. molten silica, crystalline silica and cristobalite), alumina, silicon nitride, aluminum nitride, boron nitride, titanium oxide, glass fiber and magnesium oxide. The average particle sizes and shapes of these inorganic fillers may be selected depending on the intended use.

It is preferred that the inorganic filler (D) be added in an amount of 20 to 95% by mass, more preferably 30 to 92% by mass, per the total of 100 parts by mass of the components (A) and (B).

In order to improve a bonding strength between the resin and inorganic filler, the inorganic filler is preferably surface-treated in advance with a coupling agent such as a silane coupling agent and a titanate coupling agent. Examples of such coupling agent include silane coupling agents that are, for example, epoxy silanes such as γ-glycidoxypropyltrimethoxysilane, γ-glycidoxypropylmethyldiethoxysilane and β-(3,4-epoxycyclohexyl)ethyltrimethoxysilane; amino silanes such as N-β(aminoethyl)-γ-aminopropyltrimethoxysilane, a reactant of imidazole and γ-glycidoxypropyltrimethoxysilane, γ-aminopropyltriethoxysilane and N-phenyl-γ-aminopropyltrimethoxysilane; and mercaptosilanes such as γ-mercaptosilane and γ-(thiiranylmethoxy)propyltrimethoxysilane. Here, there are no particular restrictions on the amount of the coupling agent used for surface treatment and a surface treatment method.

(E) Other Additives

In addition to the components (A) to (D), other additives may also be added to the heat-curable resin composition of the present invention if necessary, without impairing the purposes and effects of the invention. Examples of such additives include a mold release agent, a flame retardant, an ion trapping agent, an antioxidant, an adhesion imparting agent, a low stress agent and a colorant.

The mold release agent is added to improve a mold releasability from a mold. Any known mold release agent may be used as the mold release agent of the invention, and examples of such mold release agent include a carnauba wax, a rice wax, a candelilla wax, polyethylene, oxidized polyethylene, polypropylene, montanic acid, stearic acid, stearic acid ester, stearic acid amide, and a montan wax which is an ester compound prepared by combining montanic acid with, for example, a saturated alcohol, 2-(2-hydroxyethylamino)ethanol, ethylene glycol or glycerin.

The flame retardant is added to impart a flame retardancy. There are no particular restrictions on such flame retardant, and any known flame retardant may be used. For example, there may be used a phosphazene compound, a silicone compound, a zinc molybdate-supported talc, a zinc molybdate-supported zinc oxide, an aluminum hydroxide, a magnesium hydroxide and a molybdenum oxide.

The ion trapping agent is added to trap the ion impurities contained in the resin composition, and avoid a thermal degradation and a moisture absorption degradation. While there are no particular restrictions on such ion trapping agent; and any known ion trapping agent may be used, examples of such ion trapping agent include hydrotalcites, a bismuth hydroxide compound and rare-earth oxides.

The added amount of the additive(s) as the component (E) varies depending on the intended use of the composition of the invention. However, the component (E) is normally added in an amount of not larger than 5% by mass with respect to the whole composition.

Method for Producing Composition

The heat-curable resin composition of the present invention can be produced by the following method.

For example, a mixture of the components (A) to (C) can be obtained by simultaneously or separately mixing, stirring, melting and/or dispersing the cyanate ester compound (A) having the cyanate ester group equivalent of 50 to 140, the cyanate ester compound (B) having the cyanate ester group equivalent of 150 to 500 and the curing accelerator (C), while performing a heating treatment if necessary. Preferably, the mixture of the components (A) to (C) may also be obtained by adding the curing accelerator (C) to a mixture of the components (A) and (B), and then stirring, melting and/or dispersing the component(s). Further, at least one of the inorganic filler (D), mold release agent, flame retardant and ion trapping agent may be added to and mixed with either the mixture of the components (A) and (B) or the mixture of the components (A) to (C), depending on the intended use. Each component may employ one kind thereof or not less than two kinds thereof.

In the method for producing the composition of the present invention, there are no particular restrictions on a device(s) for performing mixing, stirring and dispersion. Specific examples of such device(s) include a kneader equipped with a stirring and heating devices, a twin-roll mill, a triple-roll mill, a ball mill, a planetary mixer and a mass-colloider. These devices can also be appropriately used in combination.

WORKING EXAMPLE

The present invention is described in greater detail hereunder with reference to working and comparative examples. However, the present invention is not limited to the following working examples. In Table 1, the amount of each component refers to an amount (% by mass) per a total of 100% by mass of the components (A) and (B).

(A) Cyanate Ester Compound Having a Cyanate Ester Group Equivalent of 50 to 140

(A1) Bis-E type cyanate ester compound represented by the following formula (1) (LECy by LONZA Japan) [melting point: 29° C.; viscosity: 40 mPa·s at room temperature; cyanate ester group equivalent: 133]

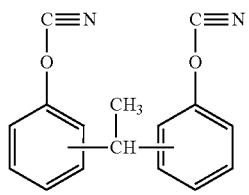

(A2) Phenol novolac type cyanate ester compound represented by the following formula (2) (PT-30 by LONZA Japan) [viscosity: 250 Pa·s at 25° C.; cyanate ester group equivalent: 119]

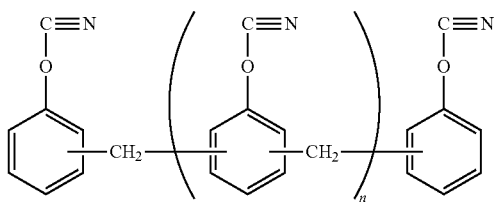

(In the formula (2), n=1 to 10)

(A3) Resorcinol type cyanate ester compound represented by the following formula (3) (REX-370 by Huntsman Corporation) [cyanate ester group equivalent: 80]

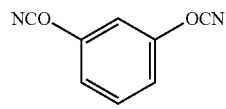

(B) Cyanate Ester Compound Having a Cyanate Ester Group Equivalent of 150 to 500

(B1) Diallylbisphenol A-type cyanate ester compound represented by the following formula (4) (A211 by Mitsubishi Gas Chemical Company, Inc.) [cyanate ester group equivalent: 179]

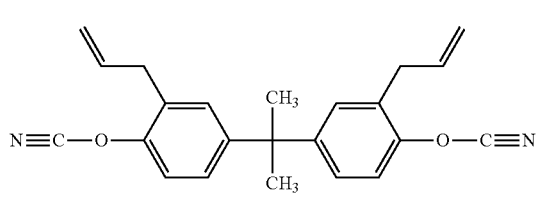

(B2) Diallylbisphenol F-type cyanate ester compound represented by the following formula (5) (by Mitsubishi Gas Chemical Company, Inc.) [cyanate ester group equivalent: 165]

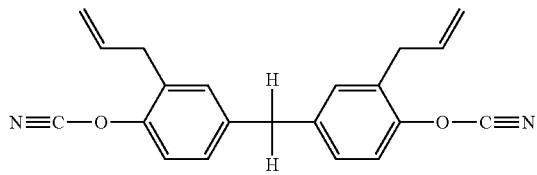

(5)

(B3) Biphenyl aralkyl-type cyanate ester compound represented by the following formula (6) (BCN by Mitsubishi Gas Chemical Company, Inc.) [cyanate ester group equivalent: 208]

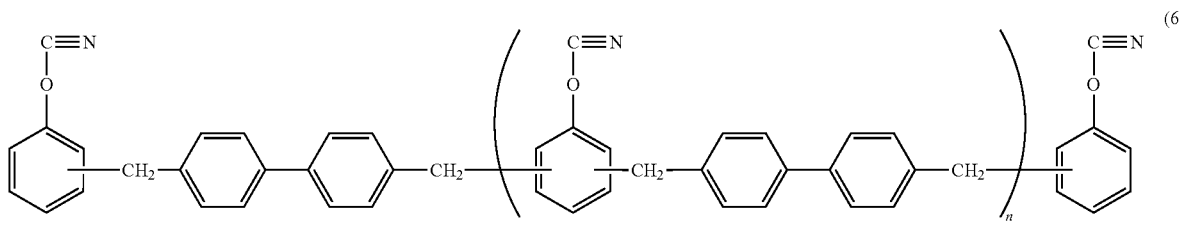

(6)

(In the formula (6), n=1 to 10)

(B4) Thioether type cyanate ester compound represented by the following formula (7) [cyanate ester group equivalent: 400]

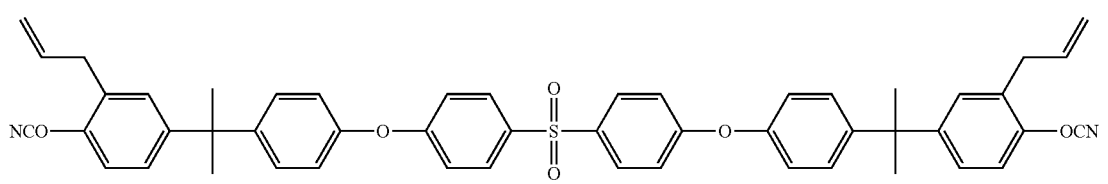

(7)

(C) Curing Accelerator (C1) Resorcinol-type phenolic resin (MEH-8400 by Meiwa Plastic Industries, Ltd.)

(C2) Allylphenol novolac resin (MEH-8000H by Meiwa Plastic Industries, Ltd.)

(C3) Tetraphenylborate salt of 1,8-diazabicyclo[5.4.0]undecene-7 derivative (U-CAT 5002 by San-Apro Ltd.)

(C4) Tetraphenylphosphonium tetra-p-tolylborate (TPP-MK by Hokko Chemical Industry Co., Ltd.)

(D) Inorganic Filler

RS-8225H (average particle size 15 μm, by TATSUMORI LTD.)

Working Examples 1 to 11; Comparative Examples 1 to 3

A heat-curable resin composition(s) having the compounding ratios (% by mass) shown in Table 1 was obtained. The following properties of the heat-curable resin composition(s) having such compounding ratios were measured. The results thereof are shown in Table 1.

Evaluation of Curability

Each heat-curable resin composition having the compounding ratios (% by mass) shown in Table 1 was poured into a mold having a thickness of 1 mm. Next, the composition was left in an oven at 150° C. for an hour, and then taken out of such oven so as to be cooled to room temperature. There, the curability of the composition was evaluated. In the curability evaluation, cured products exhibiting no surface tackiness were given "○," whereas cured products exhibiting surface tackiness or uncured compositions were given "x." The evaluation results of the curability of each cured product are shown in Table 1.

Evaluation of Adhesion

Each heat-curable resin composition having the compounding ratios (% by mass) shown in Table 1 was poured into a mold to obtain a circular truncated cone-shaped test specimen having an upper surface diameter of 2 mm, a lower surface diameter of 5 mm and a height of 3 mm. Such test specimen was then placed on a silicon chip, and was heated at 150° C. for two hours, and then at 200° C. for four hours so as to be cured. After curing, the test specimen obtained was cooled to room temperature, and a shear adhesion force thereof was then measured in a way such that a measured result was regarded as an initial value. The initial value of each test specimen is shown in Table 1.

Adhesion Force Retention Rate after High-Temperature Storage

As is the case with the method for measuring the initial value, each heat-curable resin composition prepared in the working and comparative examples was poured into a mold to obtain a circular truncated cone-shaped test specimen having an upper surface diameter of 2 mm, a lower surface diameter of 5 mm and a height of 3 mm. Such test specimen was then placed on a silicon chip, and was heated at 150° C. for two hours, and then at 200° C. for four hours so as to be cured. After curing, the test specimen obtained was stored in an oven at 200° C. for 1,000 hours, and then cooled to room temperature. There, a shear adhesion force of the test specimen was measured. An adhesion force retention rate after high-temperature storage was calculated by (shear adhesion force after stored at 200° C. for 1,000 hours)/initial value× 100(%). The adhesion force retention rate after high-temperature storage of each test specimen is shown in Table 1.

Adhesion Force Retention Rate after High-Temperature and High-Humidity Storage

As is the case with the method for measuring the initial value, each heat-curable resin composition prepared in the working and comparative examples was poured into a mold to obtain a circular truncated cone-shaped test specimen having an upper surface diameter of 2 mm, a lower surface diameter of 5 mm and a height of 3 mm. Such test specimen was then placed on a silicon chip, and was heated at 150° C. for two hours, and then at 200° C. for four hours so as to be cured. After curing, the test specimen obtained was stored at 8.5° C./85% RH for 1,000 hours, and then cooled to room temperature. There, a shear adhesion force of the test specimen was measured. An adhesion force retention rate after high-temperature and high-humidity storage was calculated by (shear adhesion force after stored at 85° C./85% RH for 1,000 hours)/initial value×100(%). The adhesion force retention rate after high-temperature and high-humidity storage of each test specimen is shown in Table 1.

Weight Reduction Rate after Heating at 200° C.

A 10×100×4 mm test specimen made of each heat-curable resin composition having the compounding ratios (% by mass) shown in Table 1, was heated at 150° C. for two hours, and then at 200° C. for four hours so as to be cured. An initial weight of the test specimen obtained was measured by an analytical balance (product name: METTLER AT201 by METTLER TOLEDO), followed by storing the test specimen in an oven at 200° C. for 500 hours. Later, the analytical balance (product name: METTLER AT201 by METTLER TOLEDO) was again used to measure the weight of such test specimen that had been heated at 200° C. A weight reduction rate after heating at 200° C. (%) was calculated based on the following formula.

$$\text{Weight reduction rate after heating at 200° C. (\%)} = \frac{\left(\begin{array}{c}\text{Weight after heating at 200° C. [g]} - \\ \text{Initial weight [g]}\end{array}\right)}{\text{Initial weight [g]}} \times 100 \quad [\text{Formula 1}]$$

Water Absorption Rate

A disk made of each heat-curable resin composition having the compounding ratios (% by mass) shown in Table 1, and having a diameter of 50 mm and a thickness of 3 mm, was heated at 150° C. for two hours, and then at 200° C. for four hours so as to be cured. An initial weight of the disk prepared was measured by the analytical balance (product name: METTLER AT201 by METTLER TOLEDO), followed by exposing the disk to a saturated water vapor at 121° C. and 2.03×10$^5$ Pa in a pressure cooker for 168 hours. Later, the analytical balance (product name: METTLER AT201 by METTLER TOLEDO) was again used to measure the weight of the disk that had now absorbed moisture. A water absorption rate (%) was calculated based on the following formula.

$$\text{Water absorption rate (\%)} = \frac{\left(\begin{array}{c}\text{Weight after absorbing moisture [g]} - \\ \text{Initial weight [g]}\end{array}\right)}{\text{Initial weight [g]}} \times 100 \quad [\text{Formula 2}]$$

Measurement of Glass-Transition Temperature (Tg)

Each cured product prepared by heating at 150° C. for two hours, and then at 200° C. for four hours, in the working and comparative examples, was processed into a 5×5×15 mm test specimen, followed by placing such test specimen in a thermal dilatometer TMA 8140C (by Rigaku Corporation). After setting a temperature program to a rise rate of 5° C./min and arranging that a constant load of 19.6 mN be applied to the test specimen, a change in size of the test specimen was then measured during a period from 25° C. to 300° C. A correlation between such change in size and temperatures was then plotted on a graph. Glass-transition temperatures in the working and comparative examples were later obtained based on such graph showing the correlation between the change in size and temperatures, and by the following method for determining the glass-transition temperature(s). The results are shown in Table 1.

Determination of Glass-Transition Temperature (Tg)

FIG. 1 is a graph showing a method for determining the glass-transition temperature. In FIG. 1, $T_1$ and $T_2$ represent two arbitrary temperatures that are not higher than the temperature at the inflection point and at which a tangent line to a size change-temperature curve can be drawn; whereas $T_1'$ and $T_2'$ represent two arbitrary temperatures that are not lower than the temperature at the inflection point and at which a similar tangent line can be drawn. $D_1$ and $D_2$ individually represent a change in size at $T_1$ and a change in size at $T_2$; whereas $D_1'$ and $D_2'$ individually represent a change in size at $T_1'$ and a change in size at $T_2'$. The glass-transition temperature ($T_g$) is then defined as the temperature at the point of intersection between a straight line connecting points ($T_1$, $D_1$) and ($T_2$, $D_2$) and a straight line connecting points ($T_1'$, $D_1'$) and ($T_2'$, $D_2'$).

TABLE 1

| | | Working example | | | | | | |
|---|---|---|---|---|---|---|---|---|
| | Equivalent | 1 | 2 | 3 | 4 | 5 | 6 | 7 |
| Cyanate ester compound (A1) | 133 | 80 | 50 | | 50 | 80 | 80 | 80 |
| Cyanate ester compound (A2) | 119 | | | 20 | | | | |
| Cyanate ester compound (A3) | 80 | | | | 30 | | | |
| Cyanate ester compound (B1) | 179 | 20 | 50 | 80 | 20 | | | |
| Cyanate ester compound (B2) | 165 | | | | | 20 | | |
| Cyanate ester compound (B3) | 208 | | | | | | 20 | |
| Cyanate ester compound (B4) | 400 | | | | | | | 20 |
| Curing accelerator (C1) | | 5 | 5 | 5 | 5 | 5 | 5 | 5 |
| Curing accelerator (C2) | | | | | | | | |
| Curing accelerator (C3) | | 0.5 | 0.5 | 0.5 | 0.5 | 0.5 | 0.5 | 0.5 |
| Curing accelerator (C4) | | | | | | | | |
| Inorganic filler (D) | | | | | | | | |
| Curability | | ○ | ○ | ○ | ○ | ○ | ○ | ○ |
| Adhesion | MPa | 33 | 29 | 34 | 31 | 27 | 35 | 28 |

TABLE 1-continued

| | | | | | | | |
|---|---|---|---|---|---|---|---|
| Adhesion force retention rate after high-temperature storage | % | 86 | 93 | 89 | 84 | 84 | 94 | 88 |
| Adhesion force retention rate after high-temperature and high-humidity storage | % | 88 | 96 | 87 | 85 | 83 | 91 | 92 |
| Weight reduction rate after heating at 200° C. | % | −0.46 | −0.33 | −0.28 | −0.55 | −0.51 | −0.35 | −0.26 |
| Water absorption rate | % | 2.0 | 1.8 | 1.8 | 2.3 | 1.9 | 2.0 | 1.8 |
| Glass-transition temperature | ° C. | 210 | 200 | 200 | 220 | 200 | 210 | 200 |

| | Working example | | | | Comparative example | | |
|---|---|---|---|---|---|---|---|
| | 8 | 9 | 10 | 11 | 1 | 2 | 3 |
| Cyanate ester compound (A1) | 80 | 80 | 80 | 80 | 100 | | 100 |
| Cyanate ester compound (A2) | | | | | | | |
| Cyanate ester compound (A3) | | | | | | | |
| Cyanate ester compound (B1) | 20 | 20 | 20 | 20 | | 100 | |
| Cyanate ester compound (B2) | | | | | | | |
| Cyanate ester compound (B3) | | | | | | | |
| Cyanate ester compound (B4) | | | | | | | |
| Curing accelerator (C1) | | | 5 | 5 | 5 | 5 | |
| Curing accelerator (C2) | 5 | 5 | | | | | |
| Curing accelerator (C3) | 0.5 | | 0.5 | 0.5 | 0.5 | 0.5 | |
| Curing accelerator (C4) | | 0.5 | | | | | |
| Inorganic filler (D) | | | 200 | 400 | | | |
| Curability | ○ | ○ | ○ | ○ | ○ | X | Curing failure |
| Adhesion | 30 | 25 | 43 | 44 | 34 | 21 | |
| Adhesion force retention rate after high-temperature storage | 90 | 91 | 86 | 87 | 41 | 54 | |
| Adhesion force retention rate after high-temperature and high-humidity storage | 84 | 81 | 94 | 95 | 35 | 45 | |
| Weight reduction rate after heating at 200° C. | −0.57 | −0.59 | −0.17 | −0.11 | −0.77 | −1.12 | |
| Water absorption rate | 2.1 | 2.3 | 0.7 | 0.4 | 3.6 | 4.5 | |
| Glass-transition temperature | 235 | 230 | 210 | 210 | 210 | 160 | |

What is claimed is:

1. A heat-curable resin composition, comprising:
(A) a cyanate ester compound having in one molecule at least two cyanato groups, and having a cyanate ester group equivalent of 50 to 140;
(B) a cyanate ester compound having in one molecule at least two cyanato groups, and having a cyanate ester group equivalent of 150 to 500; and
(C) a curing accelerator,
wherein the cyanate ester compound (A) is present in an amount of 20 to 85% by mass per a total of 100% by mass of the components (A) and (B), and the cyanate ester compound (B) is present in an amount of 15 to 80% by mass per the total of 100% by mass of the components (A) and (B), and
wherein said component (B) is a cyanate ester compound having in one molecule at least one allyl group.

2. A heat-curable resin composition, comprising:
(A) a cyanate ester compound having in one molecule at least two cyanato groups, and having a cyanate ester group equivalent of 50 to 140;
(B) a cyanate ester compound having in one molecule at least two cyanato groups, and having a cyanate ester group equivalent of 150 to 500;
(C) a curing accelerator; and,
(D) an inorganic filler,
wherein the cyanate ester compound (A) is present in an amount of 20 to 85% by mass per a total of 100% by mass of the components (A) and (B), and the cyanate ester compound (B) is present in an amount of 15 to 80% by mass per the total of 100% by mass of the components (A) and (B), and
wherein said component (B) is a cyanate ester compound having in one molecule at least one allyl group.

3. A heat-curable resin composition, comprising:
(A) a cyanate ester compound having in one molecule at least two cyanato groups, and having a cyanate ester group equivalent of 50 to 140;
(B) a cyanate ester compound having in one molecule at least two cyanato groups, and having a cyanate ester group equivalent of 150 to 500; and
(C) a curing accelerator,
wherein the cyanate ester compound (A) is present in an amount of 20 to 85% by mass per a total of 100% by mass of the components (A) and (B), and the cyanate ester compound (B) is present in an amount of 15 to 80% by mass per the total of 100% by mass of the components (A) and (B),
wherein the curing accelerator (C) contains a phenolic resin, and
wherein said component (B) is a cyanate ester compound having in one molecule at least one allyl group.

4. The heat-curable resin composition according to claim 2, wherein the curing accelerator (C) contains a phenolic resin.

5. The heat-curable resin composition according to claim 1, wherein said cyanate ester compound (A) has a cyanate ester group equivalent of 70 to 135.

6. The heat-curable resin composition according to claim 1, wherein said cyanate ester compound (A) has a cyanate ester group equivalent of 100 to 135.

7. The heat-curable resin composition according to claim 1, wherein said cyanate ester compound (B) has a cyanate ester group equivalent of 150 to 450.

8. The heat-curable resin composition according to claim 1, wherein said cyanate ester compound (B) has a cyanate ester group equivalent of 150 to 400.

9. The heat-curable resin composition according to claim 1, wherein said cyanate ester compound (A) is present in an amount of 40 to 75% by mass per a total of 100% by mass of said components (A) and (B).

10. The heat-curable resin composition according to claim 1, wherein said cyanate ester compound (A) is present in an amount of 45 to 70% by mass per a total of 100% by mass of the components (A) and (B).

11. The heat-curable resin composition according to claim 1, wherein said cyanate ester compound (B) is present in an amount of 30 to 70% by mass per the total of 100% by mass of the components (A) and (B).

12. The heat-curable resin composition according to claim 1, wherein said cyanate ester compound (B) is present in an amount of 35 to 60% by mass, per the total of 100% by mass of the components (A) and (B).

13. The heat-curable resin composition according to claim 1, wherein said curing accelerator (C) is present in an amount of 0.1 to 10% by mass per the total of 100 parts by mass of the components (A) and (B).

14. The heat-curable resin composition according to claim 1, wherein said curing accelerator (C) is present in an amount of 0.2 to 5.5% by mass per the total of 100 parts by mass of the components (A) and (B).

15. The heat-curable resin composition according to claim 2, wherein said inorganic filler (D) is present in an amount of 20 to 95% by mass per the total of 100 parts by mass of the components (A) and (B).

16. The heat-curable resin composition according to claim 2, wherein said inorganic filler (D) is present in an amount of 30 to 92% by mass per the total of 100 parts by mass of the components (A) and (B).

17. The heat-curable resin composition according to claim 2, wherein said inorganic filler (D) is one or more members selected from the group consisting of silica, alumina, silicon nitride, aluminum nitride, boron nitride, titanium oxide, glass fiber, and magnesium oxide.

18. The heat-curable resin composition according to claim 17, wherein said inorganic filler (D) is surface-treated with a coupling agent selected from the group consisting of a silane coupling agent and a titanate coupling agent.

19. The heat-curable resin composition according to claim 18, wherein said coupling agent is one or more members selected from the group consisting of γ-glycidoxypropyltrimethoxysilane, γ-glycidoxypropylmethyldiethoxysilane, β-(3,4-epoxycyclohexyl)ethyltrimethoxysilane, N-β(aminoethyl)-γ-aminopropyltrimethoxysilane, a reactant of imidazole and γ-glycidoxypropyltrimethoxysilane, γ-aminopropyltriethoxysilane, N-phenyl-γ-aminopropyltrimethoxysilane, γ-mercaptosilane, and γ-thiiranylmethoxy)propyltrimethoxysilane.

* * * * *

UNITED STATES PATENT AND TRADEMARK OFFICE
CERTIFICATE OF CORRECTION

PATENT NO. : 10,829,589 B2
APPLICATION NO. : 16/378618
DATED : November 10, 2020
INVENTOR(S) : Naoyuki Kushihara et al.

Page 1 of 1

It is certified that error appears in the above-identified patent and that said Letters Patent is hereby corrected as shown below:

On the Title Page

Item (73), the Assignee's name is misspelled. Item (73) should read:
--(73) Assignee: Shin-Etsu Chemical Co., Ltd., Tokyo (JP)--

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*